Jan. 14, 1964 W. M. BROWN 3,117,772
END MOUNTING FOR SPRING STACK SPRING SUSPENSION
Filed Oct. 27, 1961 4 Sheets-Sheet 3

INVENTOR.
WALLACE M. BROWN
BY
ATTORNEYS

Jan. 14, 1964 W. M. BROWN 3,117,772
END MOUNTING FOR SPRING STACK SPRING SUSPENSION
Filed Oct. 27, 1961 4 Sheets-Sheet 4

INVENTOR.
WALLACE M. BROWN
BY
ATTORNEYS

United States Patent Office 3,117,772
Patented Jan. 14, 1964

3,117,772
END MOUNTING FOR SPRING STACK SPRING SUSPENSION
Wallace M. Brown, Seattle, Wash., assignor to Pacific Car and Foundry Company, Seattle, Wash., a corporation of Washington
Filed Oct. 27, 1961, Ser. No. 148,280
9 Claims. (Cl. 267—54)

This invention relates to an end mounting for spring stacks, and one which lends itself particularly to a spring suspension for rear axle bogeys, being especially applicable to bogeys in which one axle is a live axle and the other a trailing axle, or in which both axles are live.

For its general object the invention aims to provide a spring suspension having a perfected end mounting for attaching the spring stack to the live axle.

It is a further and particular object to devise a spring end mounting which permits the two ends of an axle to move vertically one in relation to the other without subjecting the spring stack to a destructive twist or the axle to a bending stress.

A further particular object is to provide, in a spring suspension of the described character, an end mounting which enables the attached end of the live axle to be easily and quickly set in positions longitudinally adjusted with respect to the spring stack so as to insure that the axis of the axle lies exactly at right angles to the longitudinal median line of the vehicle.

As a further object still the invention aims to provide a spring end mounting which depends upon friction developed from squeeze pressure as a means of fixing the main leaf of the stack to the end mounting.

Yet additional objects and advantages in view will, with the foregoing, appear and be understood in the following description and claims, the invention consisting in the novel construction and in the adaptation and combination of parts hereinafter described and claimed.

Figure 1:
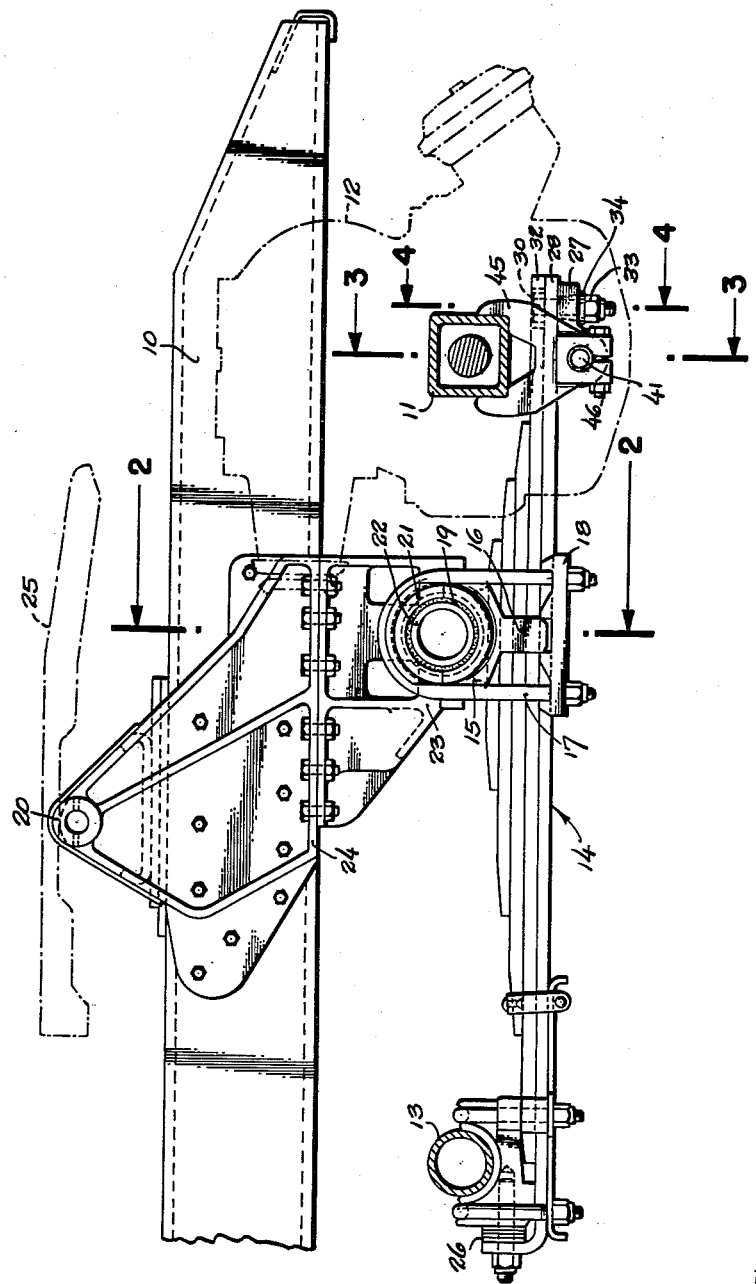

In the accompanying drawings:

FIGURE 1 is a longitudinal vertical sectional view illustrating a bogey suspension constructed to embody preferred teachings of the present invention, with the section taken along a plane lying immediately inside the near road wheels. The vehicle portrayed is a tractor of the type providing a fifth wheel to which a trailer is attached, and having only one of its bogey axles driven. The view is fragmentary in its illustration of the vehicle frame, and both the fifth wheel and a differential housing for the live axle are shown by broken lines.

Figure 2:
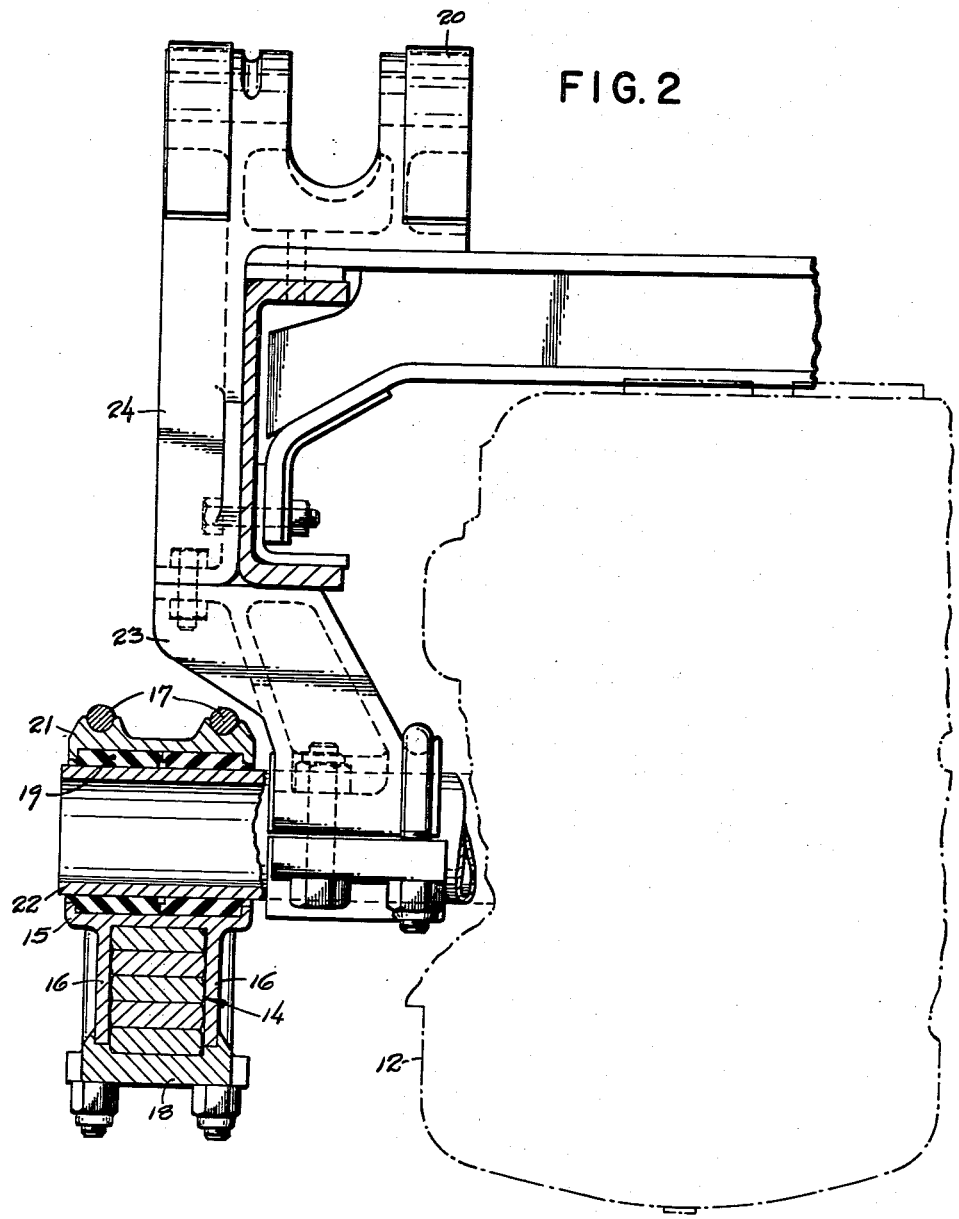

FIG. 2 is a fragmentary transverse vertical sectional view drawn to an enlarged scale on line 2—2 of FIG. 1.

Figure 3:
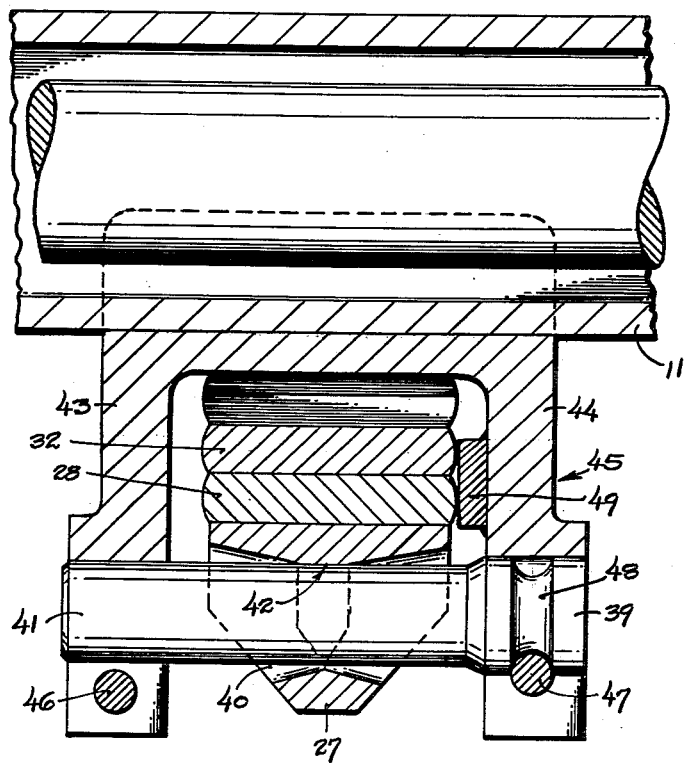
Figure 4:
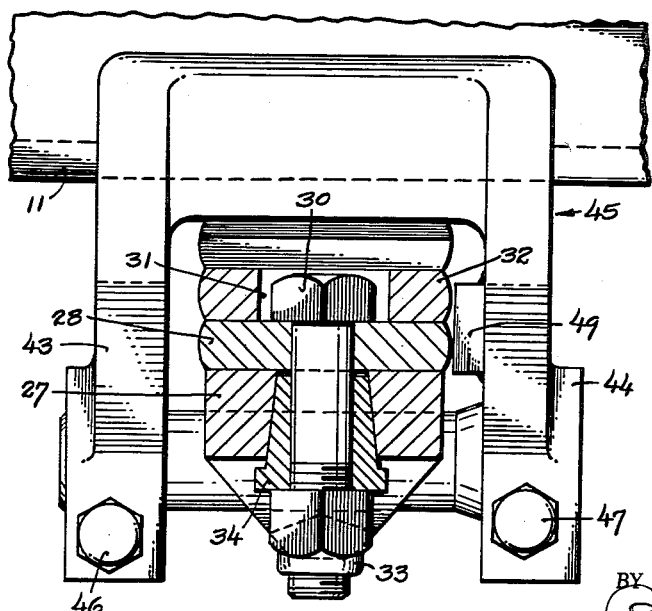

FIGS. 3 and 4 are fragmentary transverse vertical sectional views drawn to a yet larger scale on lines 3—3 and 4—4, respectively, of FIG. 1.

Figure 5:
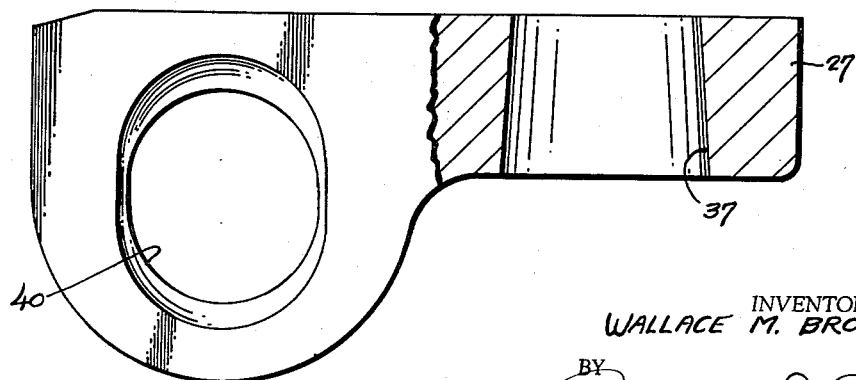

FIG. 5 is an enlarged-scale detail view partly in side elevation and partly in longitudinal vertical section illustrating the mounting eye for the end of the spring stack attached to the live axle.

Figure 6:
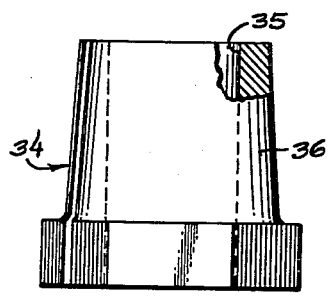
Figure 7:
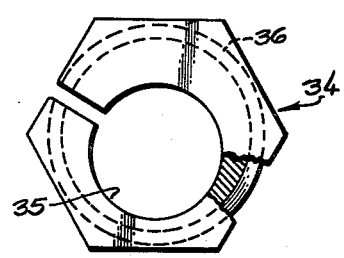
Figure 8:
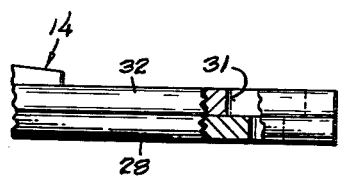
Figure 9:
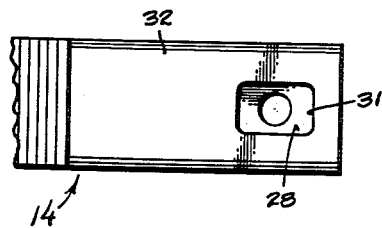

FIGS. 6 and 7 are, respectively, a side elevational view and an underside plan view detailing the eccentric bushing carried by the mounting eye and employed to properly position the live axle, the scale corresponding to that of FIG. 5; and FIGS. 8 and 9 are, respectively, a fragmentary side elevational view and a fragmentary top plan view detailing the end of the spring stack which is attached to the live axle, the scale of these views being reduced from that of FIGS. 6 and 7.

Said drawings and the following description are confined to one side only of the vehicle and it will be understood that like structure is provided at the opposite side. The reference numeral 10 designates one of the two spaced longitudinal principals of the vehicle frame. 11 denotes the housing for a live rear bogey axle driven through differential gearing contained in a differential housing 12. The bogey's complementing front axle 13 is shown as a dead or trailing axle. The spring stack 14 which springs the axles from the main frame is composed of a pile of spring leaves, and such spring stack extends longitudinally of the vehicle in a position spaced below the related frame principal 10. At its midlength the stack underlies the seat-piece 15 of a trunnion block, being confined between cheek plates 16 which depend from the latter, and is secured to the block by U-bolts 17 exerting clamping pressure upon a stirrup 18. A split rubber bushing 19, compressed by said seat-piece 15 and a complementing cap 21, grips the trunnion block to the end of a through trunnion-shaft 22. The trunnion shaft is made secure to the vehicle frame by a hanger 23. As here illustrated, the hanger is bolted to a bracket 24 and the bracket is in turn bolted to the frame principal, with the bracket presenting a journal box 20 which rises above the frame principal and gives support to a rock-shaft (not shown) which carries the fifth wheel 25.

Two of the lowermost leaves of the spring stack serve as main leaves and project by their ends to form mounting tongues. In the illustrated embodiment, one such tongue extends beyond the frame hanger substantially twice the distance to which the other tongue extends, obtaining a ⅓:⅔ weight distribution. The dead axle 13 attaches to the long end of the spring stack. The manner of such mounting will be apparent from an inspection of the drawing, no novelty being attached thereto, and it is unnecessary to describe same in detail other than to point out the provision of removable shims 26 as a means of shifting the end of the axle in a direction fore-and-aft of the spring stack.

Considering the attachment between said stack and the housing 11 for the live rear bogey axle, there is provided a mounting eye-block 27 which underlies the lower leaf 28 of the laminated rear spring tongue and is fixedly secured thereto by squeeze pressure exerted from a vertically disposed nutted bolt. The head 30 of said bolt bears upon the upper face of the leaf, being accommodated within a through-opening 31 cut in the upper main spring leaf 32. This opening is oblong with its major axis lying on the longitudinal median line of the leaf.

The nut 33 for said bolt bears upon a split bushing 34. The bushing has a cylindrical bore 35 closely fitting the bolt and has a tapered exterior surface 36 disposed eccentric to the bore. While moderately larger, the taper of the bushing corresponds to that of a vertical through-hole 37 formed in the eye-block 27.

The eye-block is an elongated body having a width approximately the same as that of the spring stack and with the top face, which frictionally grips the underside of said stack, made planar. The tapered hole 37 lies at one end of the block and the eye, denoted by 40, at the other end. Such eye extends transversely of the block with its axis disposed horizontally and normal to the longitudinal vertical plane in which the spring stack lies. The hole forming the eye is oblong, as viewed from an end, with the lesser width across the flanks. A trunnion pin 41 is received through the eye, and the eye-block bears thereon only by a hardened surface 42 located at the center of the eye. This hardened bearing surface is flat and parallel with the center line of the eye, and is comparatively short in point of axial length. From each end of such bearing surface the wall of the eye above and below the pin flares outwardly.

Excepting for an enlarged head 39 at its inner end, the trunnion pin has a uniform diameter throughout. Both ends are received in mating sockets presented by respective arms 43 and 44 of a yoke-shaped bracket 45 which straddles the spring stack, and are rigidly secured thereto by clamping bolts 46 and 47, one of which engages a circumferential groove 48 formed in the enlarged head 39 so as to lock the pin against drift. The bracket 45 is welded to the live axle housing 11. A hard wear plate 49 is welded to the inner face of the inner yoke arm 44, brushing the main leaves of the spring stack when the trunnion pin occupies the normal centered position in which the parts are shown in FIGS. 3 and 4. The flaring ends of the eye 49 permit the pin to rock about either end edge of the bearing surface 42 as a fulcrum upon relative vertical motion as between the two ends of the live axle.

While not here illustrated, a bracket surmounts the live axle housing immediately adjacent one side of the differential housing, and a radius rod extends longitudinally therefrom to a bracket fixed to a related one of the channel principals of the vehicle frame.

The significance of the eccentric bushing is that it permits the related end of the axle to be shifted longitudinally of the spring stack in order properly to position the axle such that its axis is at exact right angles to the longitudinal median line of the vehicle. The ability of the two axle ends to each rock relative to the related spring stack relieves the spring stack of twist stresses as one end of the axle rises or falls relative to the other, and gives to the axle greater freedom for such motion in that the restraint imposed by the spring stacks is confined largely to resistance against bending in substantially the longitudinal vertical plane of the stack.

It should perhaps be pointed out that normal truck construction introduces obstructions lying both to the inside and the outside of the mounting eye precluding the trunnion pin from being removed by withdrawing the same in a direction endwise to its axis. It is for this reason that the same is provided with the enlarged head 39. Upon extraction of the anchoring bolt 47 and a loosening of the clamping bolt 46 the pin need be backed off only in the degree necessary to draw the enlarged head from its socket, whereupon the bolt can be cocked and wholly withdrawn by endwise motion along an axis diagonal to the axis of the sockets.

It is believed that the invention will have been clearly understood from the foregoing detailed description of by now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A mounting for the end of a spring beam composed of multiple spring leaves bound in a pile with at least one of said leaves prolonged at the end to produce a tongue comprising, in combination with the tongue and a vehicle axle having its axis disposed transverse to the tongue and with an end traversing the same:
   (a) a mounting block fixedly secured to the tongue presenting a transverse eye and having a non-yielding bearing surface in the head wall of the eye located central to the width of the block,
   (b) a yoke member fixed to the axle having spaced apart arms overlying opposite sides of the block provided with co-axial apertures adapted to register with said eye, and
   (c) a pin received through said apertures and the eye and fixed to the yoke member, said block and yoke being so formed as to permit the pin to rock relative to the block upon said non-yielding bearing surface so as to minimize torsional stresses upon the spring beam by relative vertical motion between the two ends of the axle.

2. A mounting for the end of a spring beam composed of multiple spring leaves bound in a pile with at least one of said leaves prolonged at the end to produce a tongue comprising, in combination with the tongue and a vehicle axle having its axis disposed transverse to the tongue and with an end traversing the same:
   (a) a mounting block fixedly secured to the tongue having a transverse eye which at each of the two ends flares outwardly, top and bottom, from a central bearing surface,
   (b) a yoke member fixed to the axle having spaced apart arms overlying opposite sides of the block provided with co-axial apertures adapted to register with said eye, and
   (c) a pin received through said apertures and the eye and fixed to the yoke member, said pin admitting to rocking motion relative to the block about the head wall of said bearing surface as a horizontal fulcrum extending transverse to the eye so as to minimize torsional stresses upon the spring beam by relative vertical motion between the two ends of the axle.

3. A mounting for the end of a spring beam composed of multiple spring leaves bound in a pile with at least one of said leaves prolonged at the end to produce a tongue comprising, in combination with the tongue and a vehicle axle having its axis disposed transverse to the tongue and with an end traversing the same:
   (a) a mounting block fixedly secured to the tongue having a transverse eye which at each of the two ends flares outwardly from a central bearing surface of moderate length running parallel with the center line of the eye,
   (b) a yoke member fixed to the axle having spaced apart arms overlying opposite sides of the block provided with apertures adapted to register with said eye, and
   (c) a pin received through said apertures and the eye and fixed to the yoke member, said pin being free to rock relative to the block about either end edge of said bearing surface as a horizontal fulcrum so as to minimize torsional stresses upon the spring beam by relative vertical motion between the two ends of the axle.

4. Structure according to claim 3 in which the arm of said yoke member which lies at the inside of the spring beam presents a hardened wear plate positioned so as to brush the spring beam when the axle occupies a normal horizontal position.

5. A mounting for the end of a spring beam comprising, in combination with a vehicle axle:
   (a) longitudinally disposed spring leaves bound in a pile with at least two leaves of said pile prolonged at the end to produce a laminated tongue traversed by an end of the axle, the main leaf of said tongue providing a vertical bolt-hole located central to the width and the other leaf providing a registering oblong through-hole of which the minor axis is moderately larger than the bolt-hole and located transverse to the tongue,
   (b) a mounting block having a planar face arranged to bear against the exposed face of said main leaf and provided at one end with a bolt-hole registering with said bolt-hole of the leaf and at the other end with a transverse eye and having a non-yielding bearing surface in the head wall of the eye located central to the width of the block,
   (c) a headed bolt clamping said block to the main leaf with its head received through said oblong hole,
   (d) a yoke member fixed to the axle having spaced apart arms overlying opposite sides of the block provided with apertures adapted to register with said eye, and
   (e) a pin received through said apertures and the eye and fixed to the yoke member, said block and the yoke being so formed as to permit the pin to rock relative to the block upon said non-yielding bearing surface so as to minimize torsional stresses upon the spring beam by relative vertical motion between the two ends of the axle.

6. Structure according to claim 1 in which the block is secured to the tongue by a vertical bolt and wherein clamping pressure of the bolt is passed to the block by a bushing which fits over the bolt and presents a tapered exterior surface developed eccentric to the hole in which the bolt fits, the bolt-hole of the block being formed as a mating counterpart of said bushing and receiving the latter therein, the eccentricity of said bushing permitting the attached end of the axle to be set in selected positions longitudinally adjusted with respect to the spring beam by rotating the bushing within said bolt-hole of the block.

7. A mounting for the end of a spring beam comprising, in combination with a vehicle axle:
 (a) longitudinally disposed spring leaves bound in a pile with a main leaf of said pile prolonged at the end to produce a mounting tongue traversed by an end of the axle and having in said tongue a vertical bolt-hole located central to the width,
 (b) a block for mounting an end of the axle having a tapering vertically disposed through-hole larger in diameter than the bolt-hole,
 (c) a bushing having a mating fit in said tapered hole and providing a center-bore placed eccentric to the tapered exterior, and
 (d) a headed nutted bolt received through the center-bore of the bushing and the bolt-hole of the tongue for clamping the block to an exposed face of the tongue, the eccentricity of said bushing permitting the block to be set in selected positions longitudinally adjusted with respect to the spring beam by rotating the bushing within said bolt-hole of the block.

8. Structure according to claim 3, said apertures of the two yoke arms being circular and co-axial with the diameter of one such aperture larger than that of the other, the pin having an enlarged head at one end which fits the aperture of largest diameter and throughout approximately the remainder of its length having a diameter the same as the aperture of smallest diameter.

9. Structure for securing the axle of a vehicle to a longitudinally extending spring beam traversed by the axle, comprising a block carried by the axle and bearing against the spring beam, and means securing said two parts, namely the block and the spring means, together allowing the one to be shifted relative to the other in a direction longitudinally of the vehicle, said securing means comprising a tapered bushing fitting a mating vertical hole provided by one of said two parts and having a center-bore placed eccentric to the tapered exterior, and a headed nutted bolt received through the center-bore of the bushing and a registering vertical bolt-hole provided by the other of said two parts.

References Cited in the file of this patent

UNITED STATES PATENTS

| Re. 17,136 | Harris | Nov. 13, 1928 |
| 1,631,228 | Short | June 7, 1927 |
| 2,843,395 | Brumbaugh | July 15, 1958 |

FOREIGN PATENTS

| 693,902 | France | Sept. 8, 1930 |
| 313,897 | Italy | Jan. 11, 1934 |